US012687977B2

(12) United States Patent
Tian et al.

(10) Patent No.: US 12,687,977 B2
(45) Date of Patent: Jul. 21, 2026

(54) BAD BLOCK MAPPING BASED ON BAD BLOCK DISTRIBUTION IN A MEMORY SUB-SYSTEM

(71) Applicant: Micron Technology, Inc., Boise, ID (US)

(72) Inventors: Dahai Tian, Shanghai (CN); Jiankun Li, Guangdong (CN)

(73) Assignee: Micron Technology, Inc., Boise, ID (US)

( * ) Notice: Subject to any disclaimer, the term of this patent is extended or adjusted under 35 U.S.C. 154(b) by 104 days.

(21) Appl. No.: 18/587,184

(22) Filed: Feb. 26, 2024

(65) Prior Publication Data

US 2024/0295977 A1 Sep. 5, 2024

Related U.S. Application Data

(60) Provisional application No. 63/449,436, filed on Mar. 2, 2023.

(51) Int. Cl.
G06F 3/06 (2006.01)

(52) U.S. Cl.
CPC ............ G06F 3/064 (2013.01); G06F 3/0604 (2013.01); G06F 3/0679 (2013.01)

(58) Field of Classification Search
CPC ...... G06F 3/064; G06F 3/0604; G06F 3/0679; G06F 3/0619
See application file for complete search history.

(56) References Cited

U.S. PATENT DOCUMENTS

| | | | |
|---|---|---|---|
| 7,523,257 B2 | 4/2009 | Horn et al. | |
| 8,489,946 B2 * | 7/2013 | Galbraith ............ | G06F 11/1092 |
| | | | 714/723 |
| 2015/0317210 A1 * | 11/2015 | Palmer ................ | G06F 11/1441 |
| | | | 714/6.3 |
| 2016/0034341 A1 * | 2/2016 | Ojalvo .................. | G06F 3/0688 |
| | | | 714/773 |
| 2020/0133585 A1 * | 4/2020 | Muchherla ............ | G06F 3/0679 |

* cited by examiner

*Primary Examiner* — Francisco A Grullon
(74) *Attorney, Agent, or Firm* — Lowenstein Sandler LLP

(57) ABSTRACT

A system includes a memory device having a plurality of memory dies and a processing device operatively coupled with the memory device. The processing device is to perform operations including identifying a first logical block stripe of the memory device. The first logical block stripe includes a first plurality of blocks of the memory device. The operations further include determining that the first logical block stripe belongs to a first group of logical block stripes of a plurality of logical block stripes of the memory device. The operations further include determining that a second logical block stripe including a second plurality of blocks belong to a second group of logical block stripes. The operations further include mapping a first block of the first plurality of blocks to the second logical block stripe. The first block satisfies an error condition.

19 Claims, 9 Drawing Sheets

100

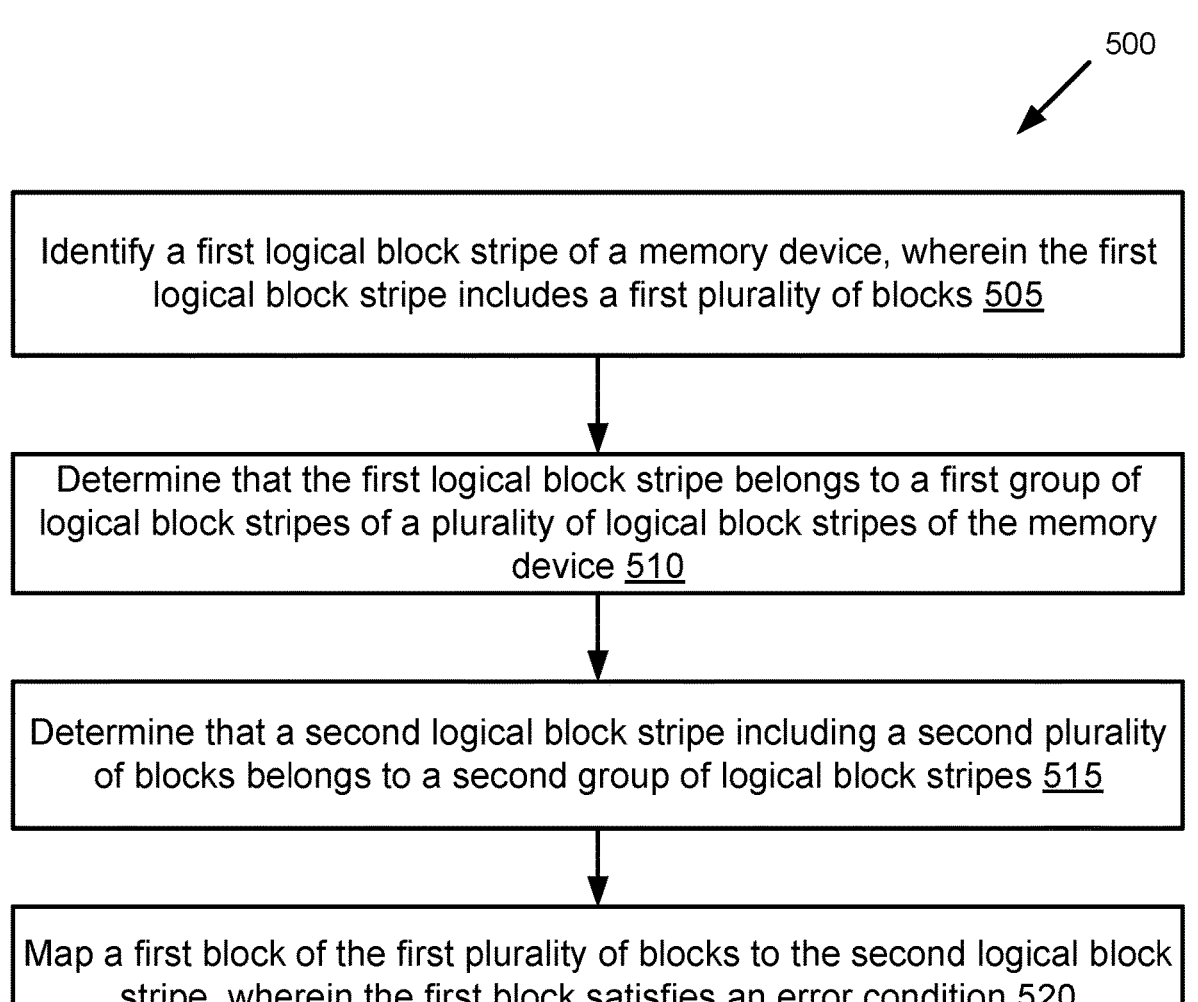

500

Identify a first logical block stripe of a memory device, wherein the first logical block stripe includes a first plurality of blocks 505

Determine that the first logical block stripe belongs to a first group of logical block stripes of a plurality of logical block stripes of the memory device 510

Determine that a second logical block stripe including a second plurality of blocks belongs to a second group of logical block stripes 515

Map a first block of the first plurality of blocks to the second logical block stripe, wherein the first block satisfies an error condition 520

FIG. 5

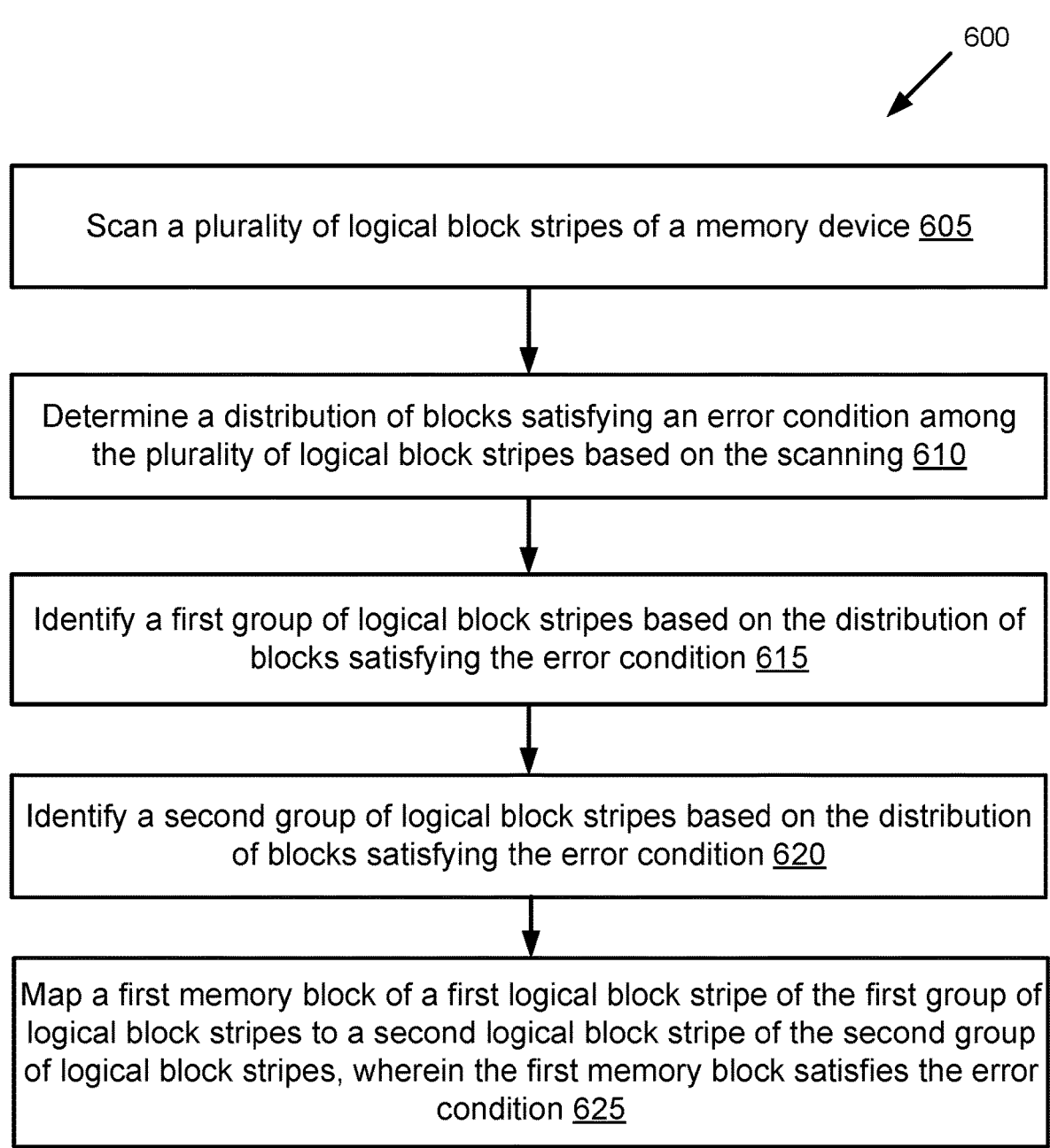

600

Scan a plurality of logical block stripes of a memory device 605

Determine a distribution of blocks satisfying an error condition among the plurality of logical block stripes based on the scanning 610

Identify a first group of logical block stripes based on the distribution of blocks satisfying the error condition 615

Identify a second group of logical block stripes based on the distribution of blocks satisfying the error condition 620

Map a first memory block of a first logical block stripe of the first group of logical block stripes to a second logical block stripe of the second group of logical block stripes, wherein the first memory block satisfies the error condition 625

FIG. 6

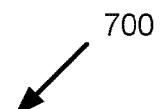

Pair a first logical block stripe of a first group of logical block stripes with a second logical block stripe of a second group of logical block stripes
705

Generate one or more parameters indicative of the pairing 710

Store the one or more parameters in a data structure 715

Determine an average number of blocks of the first logical block stripe and the second logical block stripe satisfying an error condition 720

Map a first block of the first logical block stripe to the second logical block stripe, wherein the first block satisfies the error condition 725

FIG. 7

BAD BLOCK MAPPING BASED ON BAD BLOCK DISTRIBUTION IN A MEMORY SUB-SYSTEM

RELATED APPLICATIONS

This application claims the benefit of U.S. Provisional Patent Application No. 63/449,436, filed Mar. 2, 2023, the entire contents of which are incorporated by reference herein.

TECHNICAL FIELD

Embodiments of the disclosure relate generally to memory sub-systems, and more specifically, relate to mapping bad blocks in a memory sub-system based on bad block distribution.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is a flow diagram of an example method to map a bad block in a memory sub-system in accordance with some embodiments of the present disclosure.

FIG. 6 is a flow diagram of an example method to map a bad block in a memory sub-system in accordance with some embodiments of the present disclosure.

FIG. 7 is a flow diagram of an example method to map a bad block in a memory sub-system in accordance with some embodiments of the present disclosure.

DETAILED DESCRIPTION

Figure 1A:
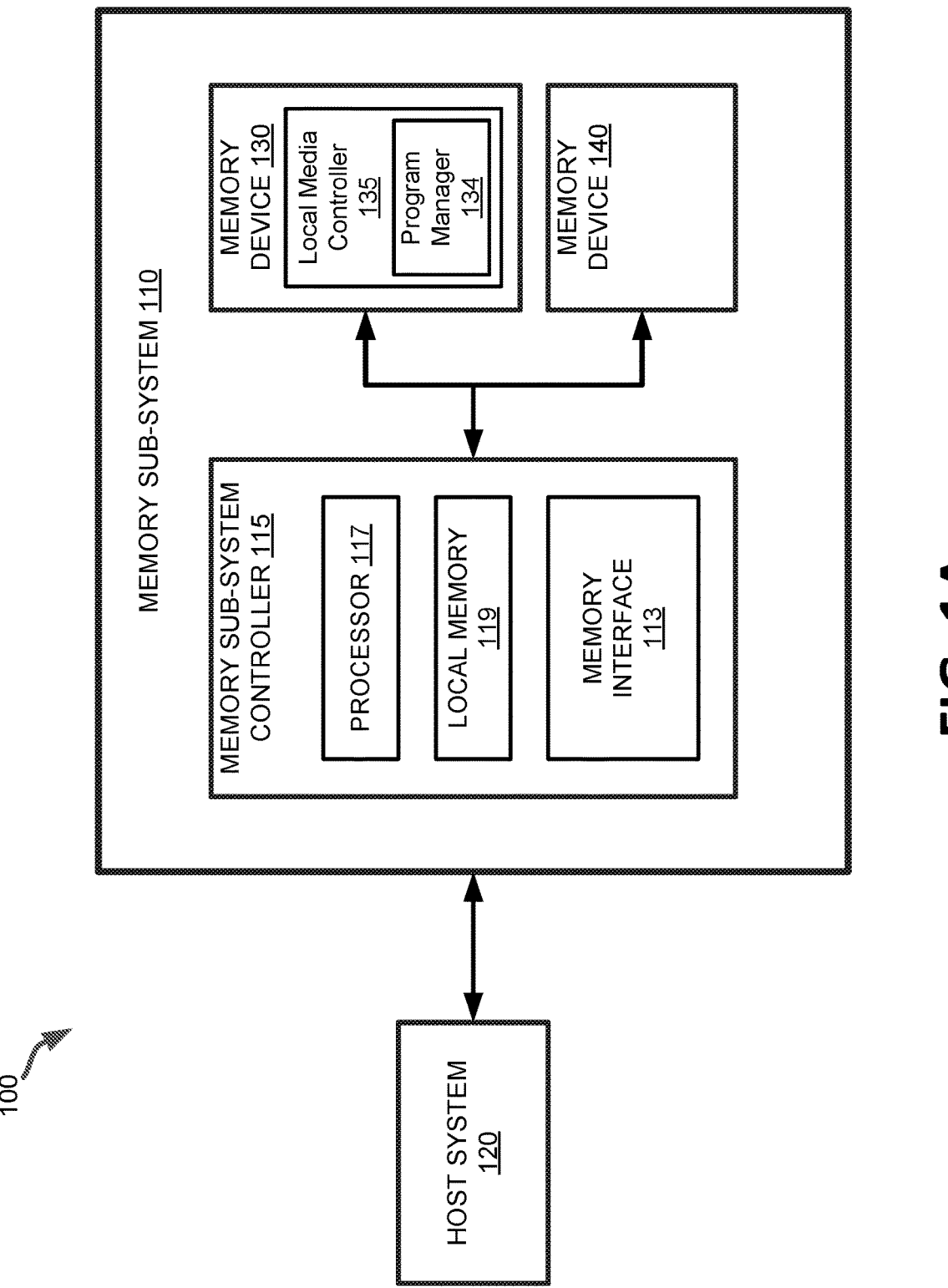
FIG. 1A illustrates an example computing system that includes a memory sub-system in accordance with some embodiments of the present disclosure.

Aspects of the present disclosure are directed to bad block mapping based on distribution of bad blocks in a memory sub-system. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1A. A non-volatile memory device is a package of one or more dies. Each die can consist of one or more planes. For some types of non-volatile memory devices (e.g., NAND devices), each plane consists of a set of physical blocks. Each block includes a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A die is also referred to as a logical unit (LUN). A LUN can contain one or more planes. A memory sub-system can use a striping scheme to treat various sets of data as units when performing data operations (e.g., write, read, erase). A LUN stripe is a collection of planes that are treated as one unit when writing, reading, or erasing data. Each plane in a LUN stripe can carry out the same operation, in parallel, of all the other planes in the LUN stripe. A block stripe is a collection of blocks that are treated as a unit. A block stripe can be a physical block stripe associated with a plane of a LUN or a logical block stripe including blocks that are mapped to the logical block stripe by processing logic. The blocks in a block stripe have the same identifier(s) that associates the blocks to the block stripe (e.g., block number, block stripe index, etc.).

A memory sub-system includes memory devices having bad blocks. A "bad block" herein refers to a block that is no longer reliable for storing or retrieving data, for example, due to a defect (e.g., manufacturing defect) or due to wear. A manufactured bad block (MBB) is unreliable due to such a defect and may already be listed in a bad block list (or look up table). A grown bad block (GBB) refers to a bad block being unreliable due to wear and can be identified based on a threshold. In some embodiments, for example, GBBs are identified as having one or more invalid bits whose reliability is not guaranteed. This level of reliability may be determined, for example, by the bad block dropping below a bit error rate (BER) threshold designated as the point of wear below which there exists unacceptable unreliability. Other ways of detecting a bad block include failure of the block to fully or properly be erased, failure to program the block, and/or failure to read data out of the block, e.g., attempting a read operation results in an uncorrectable data read error.

Due to non-uniformity and variation in a manufacturing process, the memory sub-system may initially include a reasonable ratio of bad blocks (e.g., "factory error bad blocks"). In addition, good blocks (i.e., blocks that are not classified as a bad block and that can initially reliably store data) can become bad blocks (referred to as "grown bad blocks") as blocks wear out during the lifetime of the memory sub-system and/or due to damage or defects of the memory cells. For example, during an erase operation, the data stored in one or more memory cells of bad blocks can fail to be properly erased. Accordingly, in the memory sub-system, bad blocks are not used to store data. Instead, the memory sub-system tracks bad blocks in order to avoid storing any data at the bad blocks. Therefore, the memory capacity of the memory sub-system can decrease as more blocks become unreliable and are thus not used for data storage.

More than a threshold number of bad blocks in a block stripe (e.g., in a logical blocks tripe) can lead to poor or inconsistent performance. Some memory sub-systems may skip programming block stripes with more than a threshold number of bad blocks. This practice can remedy inconsistencies introduced into the memory sub-system performance by the excessive number of bad blocks but at the expense of wasting block stripes. Since locations of bad blocks in a memory device may not be random (e.g., bad blocks tend to be located near each other in the LUN), some systems may form block stripes by assigning memory blocks at differing locations in the LUN to a block stripe in an attempt to separate groups of bad blocks into different block stripes (e.g., to decrease the likelihood of assigning neighboring bad blocks to the block stripe). For example, some systems may assign different blocks on differing planes from different LUNs to a block stripe (e.g., forming a logical block stripe, etc.). This practice can alleviate problems caused by too many bad blocks in a block stripe by generally reducing the number of bad blocks per block stripe. However, some block stripes can include significantly more bad blocks than other block stripes. Performance of the memory sub-system can thus still be inconsistent.

Aspects of the present disclosure address the above-noted and other deficiencies by mapping bad blocks in block stripes of a memory sub-system in order to increase the performance consistency of the memory sub-system. Accordingly, memory sub-systems operating according to aspects of the present disclosure can have a narrower distribution of bad blocks amongst block stripes. For example, while one example memory sub-system may include block stripes having as few as four bad blocks per block stripe and block stripes with as many as fourteen bad blocks per block stripe, a distribution width of ten, another example memory sub-system may include block stripes having only as few as five bad blocks per block stripe and block stripes with as many as eleven bad blocks per block stripe, a distribution width of six which is a smaller width than the previous example outlined above. In some embodiments, this is accomplished by identifying a distribution of bad blocks in block stripes across a memory device. The distribution of bad blocks over the memory device can often be modeled by a normal distribution (sec. FIG. 4). In some embodiments, block stripes in the upper tail of the distribution or the lower tail of the distribution are identified. Block stripes in the upper tail of the distribution may include more bad blocks while block stripes in the lower tail of the distribution have fewer bad blocks. In some embodiments, block stripes in the upper tail are classified in a first group and block stripes in the lower tail are classified in a second group. In some embodiments, each block stripe in the first group is paired with a corresponding block stripe in the second group. In some examples, a first block stripe in the first group having the greatest number of bad blocks is paired (e.g., associated) with a second block stripe in the second group having the least number of bad blocks. The pairing may include entering one or more parameters indicative of the first block stripe and/or the second block stripe into a data structure The parameters may indicate that the first block stripe and the second block stripe are corresponding peer block stripes. In some embodiments, the average number of bad blocks is calculated over the two block stripes. In some embodiments, bad blocks are mapped (e.g., using bitmaps such as those shown in FIG. 3) from the first block stripe to the second block stripe so that each of the first and second block stripes would include the average number of bad blocks. Good blocks are similarly mapped from the second block stripe to the first block stripe so that each block stripe has the same number of blocks.

Each pair of corresponding block stripes from the first group and the second group may be processed similarly. In some embodiments, each block stripe in the first group is paired with a corresponding block stripe in the second group and bad blocks are mapped from block stripes in the upper tail of the distribution to block stripes in the lower tail of the distribution. In some embodiments, good blocks are similarly mapped from block stripes in the lower tail of the distribution to block stripes in the upper tail of the distribution. Mapping bad blocks from one block stripe to another may reduce the number of bad blocks of the first block stripe while increasing the number of bad blocks of the second block stripe. Thus, the distribution of bad memory blocks amongst the block stripes is narrowed (see FIG. 4), leading to an increase in performance consistency of the memory sub-system.

Advantages of the present disclosure include providing more consistent memory sub-system performance. For example, by narrowing the distribution of bad blocks across block stripes of a memory device, sequential write operations are not hampered by seemingly random distribution of bad blocks that could otherwise occur. Because the distribution of bad blocks across the block stripes is narrowed, the memory sub-system is more likely to meet performance consistency benchmarks. Therefore, fewer manufactured memory sub-systems having errors (e.g., bad blocks) are thrown away, leading to greater manufacturing output. The bad block mapping scheme described herein also reduces the consumption of memory resources and increases the speed at which data operations can be serviced based on the mapping. Additionally, by using the method of mapping bad blocks between peer logical block stripes as described herein, performance of memory sub-systems according to embodiments described herein can have increased performance, leading to faster memory operations such as sequential write operations and decreased latency.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array.

Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a memory interface component 113 that can handle interactions of memory sub-system controller 115 with the memory devices of memory sub-system 110, such as memory device 130. For example, memory interface component 113 can receive data from memory device 130, such as data retrieved in response to a read operation or a write operation. In some examples, the memory sub-system controller 115 can include a processor 117 (processing device) configured to execute instructions stored in local memory 119 for performing the operations described herein.

In some embodiments, memory device 130 includes a program manager 134 configured to carry out bad block mapping operations. In some embodiments, local media controller 135 includes at least a portion of program manager 134 and is configured to perform the functionality described herein. In some embodiments, the program manager 134 is part of the host system 110, an application, or an operating system. Further details with regards to the operations of program manager 134 are described below. In some embodiments, program manager 134 is implemented on memory device 130 using firmware, hardware components, or a combination of the above. In some embodiments, program manager 134 receives, from a requestor, such as the memory sub-system controller 115 (e.g., specifically, memory interface 113), a request to configure and/or generate (e.g., identify) one or more logical block stripes on a memory array of the memory device 130. In some embodiments, the program manager 134 can determine a distribution of bad blocks amongst block stripes of the memory array. The distribution may be approximately a normal distribution. In some embodiments, the program manager 134 can further identify block stripes in an upper tail of the distribution and block stripes in a lower tail of the distribution. The program manager 134 may classify the block stripes into groups.

In some embodiments, the program manager 134 can map bad blocks from block stripes in an upper tail of a bad block distribution to block stripes in a lower tail of the bad block distribution. In some embodiments, the program manager 134 can map the bad blocks from a logical block stripe in the upper tail to a peer logical block stripe in the lower tail. The program manager 134 may generate one or more maps (e.g., bitmaps) to perform this function. In some embodiments, the program manager 134 may generate parameters and/or maps associated with the mapping of the bad blocks and/or pairing of block stripes. In some embodiments, the parameters and/or maps are stored in one or more data structures. The parameters can be stored in a data structure for later reference (e.g., by the memory interface 113, etc.) for servicing a data command such as a write command or a read command. For example, one or more parameters or maps stored by the program manager 134 can include a first bitmap indicating logical block stripes having memory blocks that are to be mapped (see FIG. 3). One or more second bitmaps may indicate which memory blocks are to be mapped between logical block stripes (see FIG. 3). One or more parameters stored in a data structure can indicate the logical block stripes between which the memory blocks are to be mapped (e.g., which logical block stripes are paired together for mapping). In some embodiments, the parameters and/or maps are stored in a storage location such as in local memory 119 or one or more memory blocks of memory device 130.

Figure 1B:
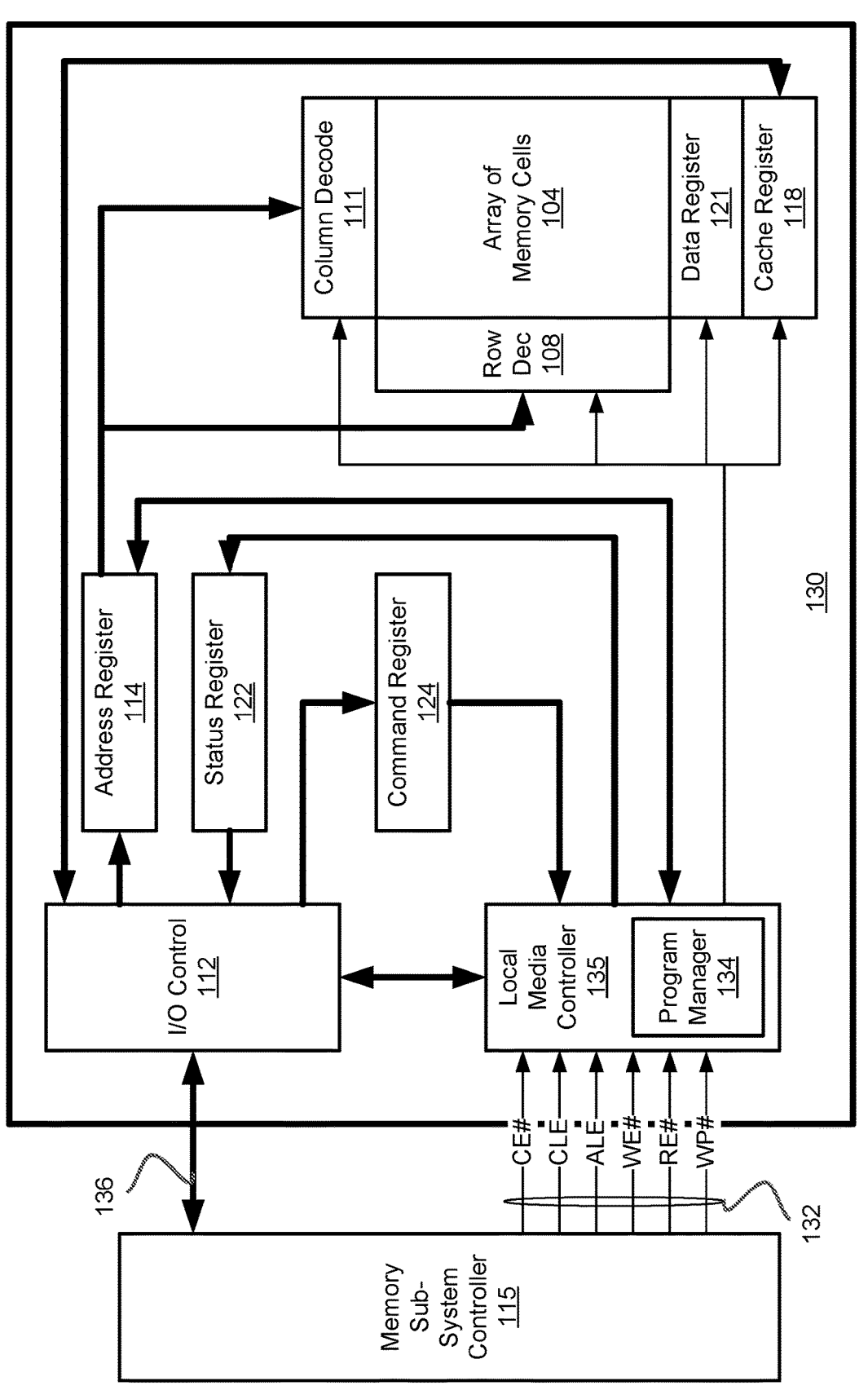
FIG. 1B is a block diagram of a memory device in communication with a memory sub-system controller of a memory sub-system, according to an embodiment.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line can be associated with more than one logical row of memory cells and a single data line can be associated with more than one logical column. Memory cells (not shown in FIG. 1B) of at least a portion of array of memory cells 104 are capable of being programmed to one of at least two target data states.

Row decode circuitry 108 and column decode circuitry 111 are provided to decode address signals. Address signals are received and decoded to access the array of memory cells 104. Memory device 130 also includes input/output (I/O) control circuitry 112 to manage input of commands, addresses and data to the memory device 130 as well as output of data and status information from the memory device 130. An address register 114 is in communication with I/O control circuitry 112 and row decode circuitry 108 and column decode circuitry 111 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 111 to control the row decode circuitry 108 and column decode circuitry 111 in response to the addresses. In at least one embodiment, local media controller 135 includes program manager 134, which can implement the bad block mapping operations with respect to memory device 130, as described herein.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a programming operation (e.g., a write operation), data can be passed from the cache register 118 to the data register 121 for transfer to the array of memory cells 104; then new data can be latched in the cache register 118 from the I/O control circuitry 112. During a read operation, data can be passed from the cache register 118 to the I/O control circuitry 112 for output to the memory sub-system controller 115; then new data can be passed from the data register 121 to the cache register 118. The cache register 118 and/or the data register 121 can form (e.g., can form a portion of) a page buffer of the memory device 130. A page buffer can further include sensing devices (not shown in FIG. 1B) to sense a data state of a memory cell of the array of memory cells 104, e.g., by sensing a state of a data line connected to that memory cell. A status register 122 can be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In at least one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands can be received over input/output (I/O) pins [7:0] of I/O bus 136 at I/O control circuitry 112 and can then be written into command register 124. The addresses can be received over input/output (I/O) pins [7:0] of I/O bus 136 at I/O control circuitry 112 and can then be written into address register 114. The data can be received over input/output (I/O) pins [7:0] for an 8-bit device or input/output (I/O) pins [15:0] for a 16-bit device at I/O control circuitry 112 and then can be written into cache register 118. The data can be subsequently written into data register 121 for programming the array of memory cells 104.

In at least one embodiment, cache register 118 can be omitted, and the data can be written directly into data register 121. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

In some implementations, additional circuitry and signals can be provided, and that the memory device 130 of FIG. 1B has been simplified. It should be recognized that the functionality of the various block components described with reference to FIG. 1B cannot necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

Figure 2:
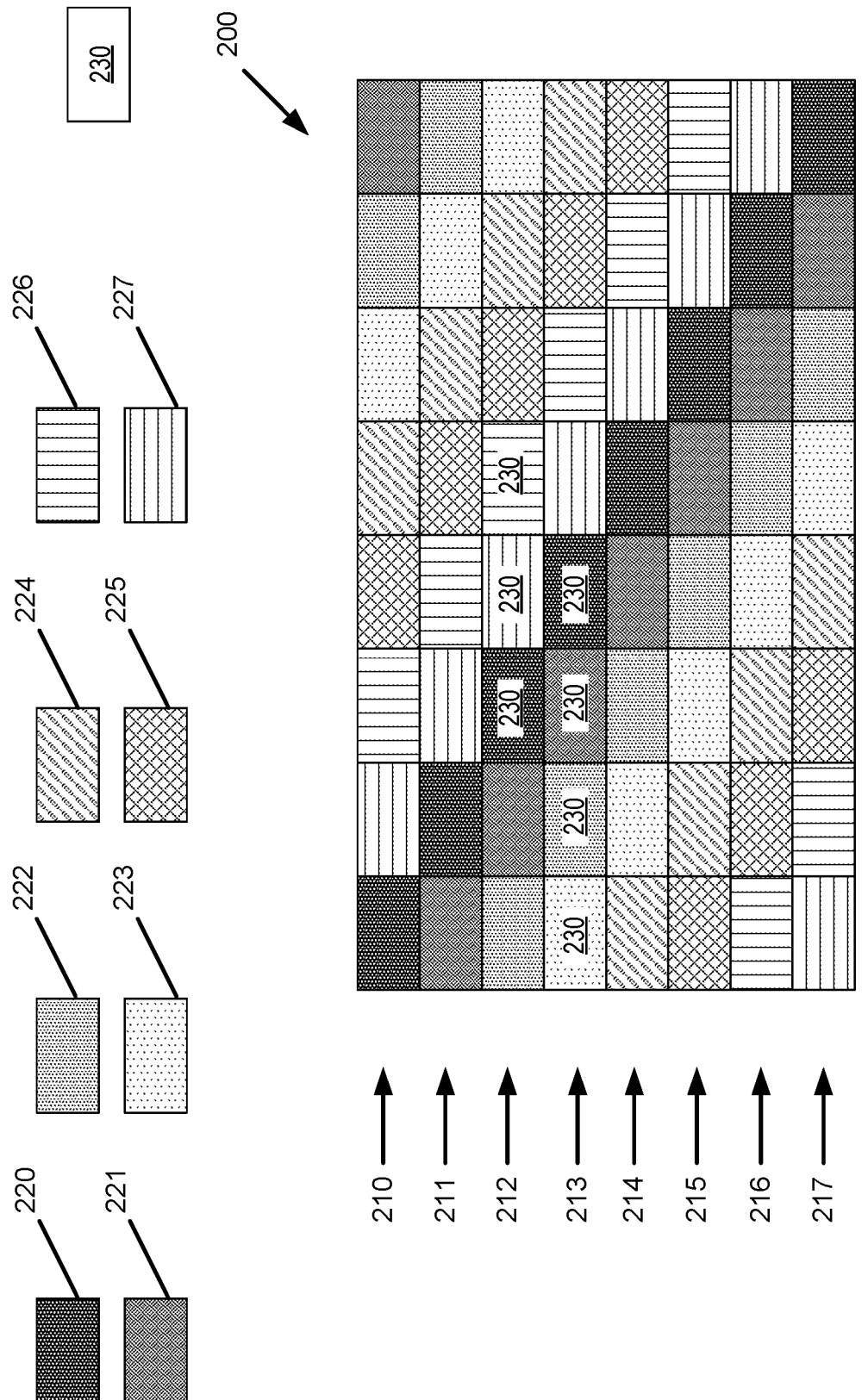
FIG. 2 is a block diagram illustrating an array of blocks organized in logical block stripes across a multi-die memory device in accordance with some embodiments of the present disclosure.

FIG. 2 is a block diagram illustrating an array of blocks 200 organized in logical block stripes across a multi-die memory device in accordance with some embodiments of the present disclosure. In some embodiments, processing logic (such as that of program manager 134 of FIGS. 1A and 1B) can identify logical block stripes by grouping memory blocks together. The blocks may be grouped by indexing the blocks in a data structure such as a look-up-table that associated the blocks with discrete logical block stripes. In some embodiments, an array of blocks 200 may be made up of multiple physical block stripes 210-217. Each physical block stripe 210-217 may correspond to a memory plane. In some embodiments, the array of blocks 200 includes blocks of one or more memory dies.

In some embodiments, processing logic can scan the memory blocks of the array of blocks 200 to identify the bad blocks. The scan operation may determine which blocks have a BER below a BER threshold, and/or to determine which blocks have not been fully or properly erased. Similarly, the scan operation may be to determine which blocks data cannot be read. In some embodiments, the bad blocks satisfy an error condition. For example, the bad blocks may have a BER above a BER threshold, may not be fully or properly erased, and/or cannot be read. The array of blocks 200 can include multiple bad blocks 230. The bad blocks 230 may be located proximate one another in the array. In some embodiments, multiple bad blocks 230 are located adjacent to each other. For example, physical block stripe 213 includes four such bad blocks 230, and adjacent physical block stripe 212 includes three bad blocks 230 which are adjacent to the bad blocks 230 of physical block stripe 213.

In some embodiments, processing logic may assign memory blocks of physical block stripes 210-217 to logical block stripes 220-227. In some embodiments, logical block stripes 220-227 are identified using an offset between physical block stripes. In some embodiments, a logical block stripe includes a first block of a first physical block stripe and a second block of a second physical block stripe that is offset from the first block. In some embodiments, the logical block stripe further includes a third block of a third physical block stripe offset from the second block. For example, logical block stripe 220 includes a first block of physical block stripe 210, a second block of physical block stripe 211, a third block of physical block stripe 212, and so on. In a similar example, logical block stripe 226 includes a first block of physical block stripe 216, a second block of physical block stripe 217, a third block of physical block stripe 210, a fourth block of physical block stripe 211, and so on. The scheme described in the preceding example corresponds to a skew offset of one. In some embodiments, logical block stripes can be formed based on a skew offset of two, three, or four, etc. The skew offset may be selected based on a scan of multiple memory dies (e.g., memory blocks of memory dies) to determine one or more physical locations of the bad blocks. In some embodiments, the blocks are mapped to the logical block stripes based on the skew offset.

Forming logical block stripes using a skew offset rather than utilizing physical block stripes may effectively separate adjacent bad blocks 230 into different logical block stripes. In some embodiments, adjacent bad blocks 230 that are in the same physical block stripe can be distributed amongst multiple logical block stripes. For example, while physical block stripe 213 includes four bad blocks 230, logical block stripe 220 includes only two bad blocks 230. Similarly, while physical block stripe 212 includes three bad blocks 230, logical block stripe 222 includes only a single bad block 230. By reducing the number of bad blocks 230 in any given block stripe by redistributing bad blocks 230 amongst other block stripes, performance consistency of the memory device can be improved.

Although bad blocks 230 are redistributed in the simplified examples described above, the distribution of bad blocks 230 amongst logical block stripes does not allow for sufficiently consistent memory device performance. A distribution of bad blocks 230 amongst logical block stripes identified using a skew offset can often be modeled by a normal distribution, as shown by distribution 410 of FIG. 4. In some examples, a lower tail 412 of distribution 410 is representative of block stripes having fewer than a first (e.g., lower) threshold number of bad blocks, while an upper tail 414 of distribution 410 is representative of block stripes having greater than a second (e.g., higher) threshold number of bad blocks. In some embodiments, the first threshold corresponds to the second threshold. In some embodiments, the number of block stripes having fewer than the first threshold number of bad blocks is the same as the number of block stripes having greater than the second threshold number of bad blocks. In some embodiments, the first threshold and the second threshold is determined so that the number of block stripes represented by the lower tail and the number of block stripes represented by the upper tail is the same. Mapping bad blocks from block stripes in the upper tail of distribution 410 to block stripes in the lower tail can improve the performance consistency of the memory device, which may improve the overall performance of the memory device.

Figure 3:
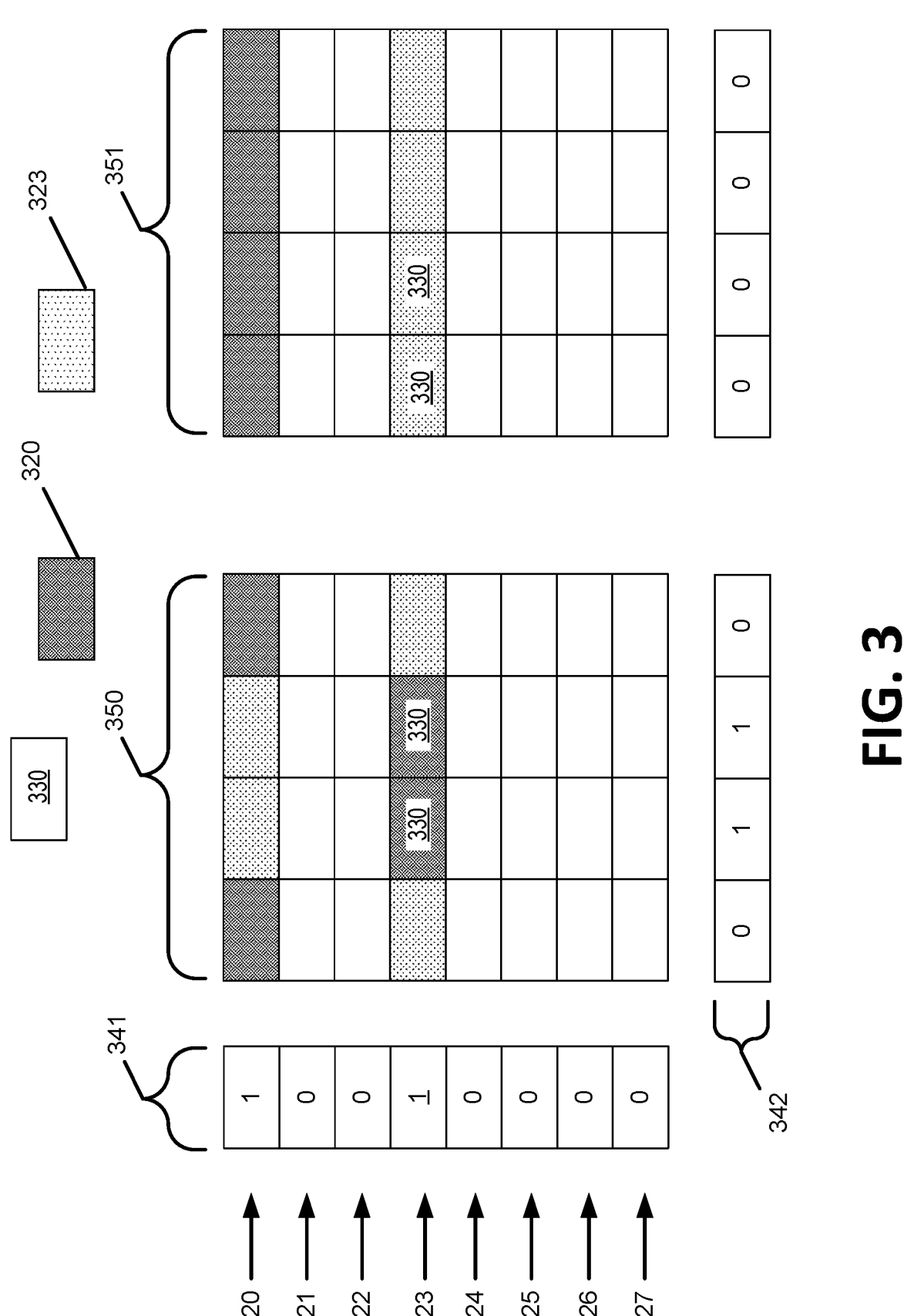
FIG. 3 is a block diagram illustrating example bad block mapping bitmaps in accordance with some embodiments of the present disclosure.
Figure 4:
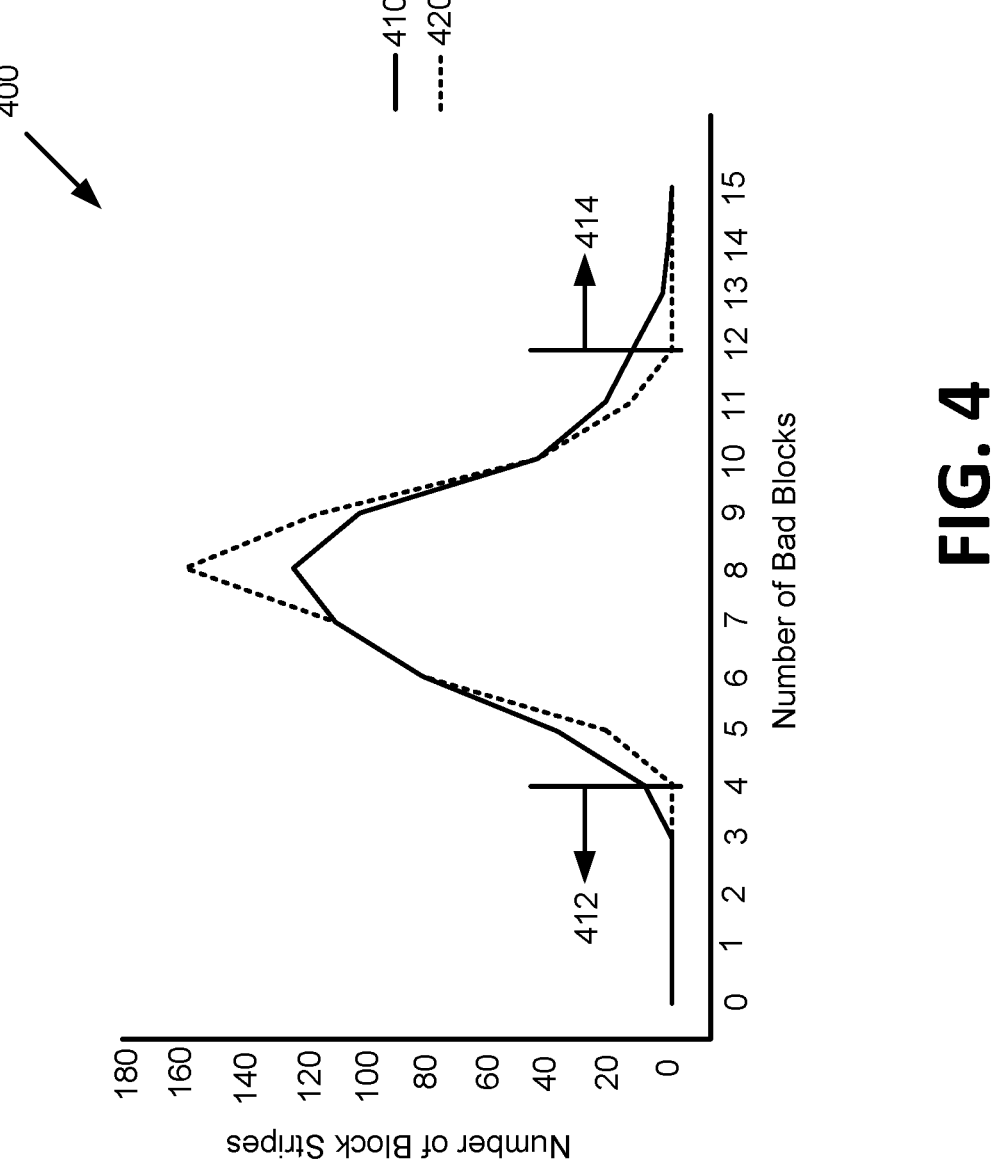
FIG. 4 is a chart depicting bad block distribution across logical block stripes of a memory device in accordance with some embodiments of the present disclosure.

FIG. 3 is a block diagram illustrating example bad block mapping bitmaps in accordance with some embodiments of the present disclosure. In some embodiments, processing logic creates one or more bitmaps (e.g., first level bitmap 341, second level bitmap 342) to map bad blocks 330 from one logical block stripe to another. In some embodiments, logical block stripes 320-327 are identified (e.g., generated) based on a skew offset (e.g., as described with respect to FIG. 2). Logical block stripes 320-327 may include groups of memory blocks across memory dies such as memory die 350 and memory die 351. For example, logical block stripe 320 includes blocks of memory die 350 and blocks of memory die 351. In another similar example, logical block stripe 323 also includes blocks of memory die 350 and blocks of memory die 351.

In some embodiments, logical block stripe 323 belongs to a group of logical block stripes corresponding to an upper tail of a distribution of bad blocks amongst logical block stripes of a memory device. In some embodiments, logical block stripe 320 similarly belongs to a group of logical block stripes corresponding to a lower tail of a distribution of bad blocks amongst logical block stripes of the memory device. In some embodiments, processing logic orders logical block stripes in the group from fewest bad blocks to most bad blocks. A logical block stripe in the group corresponding to the upper tail of the distribution having the largest number of bad blocks may be paired (e.g., partnered, etc.) with a logical block stripe in the group corresponding to the lower tail of the distribution having the smallest number of bad blocks. Similarly, logical block stripe in the group corresponding to the upper tail having the next largest number of bad blocks may be paired with a logical block stripe in the group corresponding to the lower tail having the next smallest number of bad blocks, and so on. The paired logical block stripes may be referred to as "peer" block stripes. In some embodiments, the pairing is to identify logical block stripes to which and/or from which individual memory blocks are mapped. One or more parameters indicative of each pairing may be stored in a data structure such as a look-up-table.

In some embodiments, a first level bitmap 341 indicates logical block stripes having blocks that are to be mapped. In some embodiments, first level bitmap 341 includes an entry for each logical block stripe of a memory device. The entries of first level bitmap 341 may indicate whether a logical block stripe includes memory blocks that are to be mapped to a peer logical block stripe. For example, first level bitmap 341 includes entries corresponding to logical block stripes 320-327. An entry corresponding to logical block stripe 320 is 1. Entries corresponding to logical block stripes 321 and 322 are both 0. An entry corresponding to logical block stripe 323 is also 1. Entries corresponding to logical block stripes 324-237 are also 0. An entry of 1 indicates that the corresponding logical block stripe includes memory blocks that are to be mapped to a peer logical block stripe. Therefore, in this example, logical block stripe 320 and logical block stripe 323 include blocks that are to be mapped to a peer logical block stripe. In some embodiments, the peer logical block stripe is another logical block stripe to which the logical block stripe is paired for the purpose of mapping bad blocks and/or good blocks. etc.

In some embodiments, a second level bitmap 342 indicates which memory blocks of logical block stripes corresponding to the second level bitmap 342 are to be mapped.

In some embodiments, a second level bitmap 342 is created for each pair of peer logical block stripes. In some embodiments, second level bitmap 342 includes an entry for each memory block of a corresponding logical block stripe. The entries of the second level bitmap 342 may indicate whether a block is to be mapped from one logical block stripe to another. In some embodiments, at least some bad blocks 330 may be mapped from one logical block stripe to another.

In an example, second level bitmap 342 corresponding to logical block stripe 320 and/or logical block stripe 323 includes entries for each memory block of the logical block stripe. A first entry corresponding to a first block is 0. A second entry corresponding to second block and a third entry corresponding to a third block are both 1. Fourth through eighth entries corresponding to fourth through eighth blocks are 0. An entry of 1 indicates that the corresponding block is to be mapped to a peer logical block stripe. Therefore, in this example, second and third blocks may be mapped between logical block stripe 320 and logical block stripe 323.

In some embodiments, a data structure (such as a look-up-table, etc.) stores parameters indicative of peer logical block stripes. For example, a data structure stores information linking logical block stripe 320 to logical block stripe 323 as peer logical block stripes. The data structure may similarly store information linking other logical block stripes as peers. In some embodiments, blocks indicated by second level bitmap 342 are mapped between peer logical block stripes indicated by the data structure. For example, a data structure (not illustrated) indicates that logical block stripe 320 and logical block stripe 323 are peer logical block stripes. The bad blocks 330 of logical block stripe 323 are mapped to logical block stripe 320 and good blocks of logical block stripe 320 are mapped to logical block stripe 323, as indicated by the '1' entries of second level bitmap 342.

In some embodiments, bad blocks 330 may be mapped between peer logical block stripes such that each peer logical block stripe includes an average number of bad blocks 330. For example, logical block stripe 320 initially included zero bad blocks 330, while logical block stripe 323 initially included four bad blocks 330. The average number of bad blocks 330 between logical block stripe 320 and logical block stripe 323 is two. Two bad blocks 330 are mapped from logical block stripe 323 to logical block stripe 320 (e.g., as indicated by second level bitmap 342 and an unillustrated data structure indicating the logical block stripe 323 and logical block stripe 320 are peer logical block stripes). Thus, bad blocks 330 are mapped so that each of logical block stripe 320 and logical block stripe 323 include the average number of bad blocks 330 (e.g., two bad blocks 330).

When a data operation (e.g., a data write operation, a data read operation, a bad block mapping operation, etc.) is performed, processing logic may search the first level bitmap 341 to determine which logical block stripes include blocks that are mapped (e.g., are to be mapped) from one logical block stripe to another. Processing logic may search one or more corresponding second level bitmaps 342 to determine which blocks of the corresponding logical block stripes are mapped (e.g., are to be mapped) from one logical block stripe to another. Each logical block stripe indicated by the first level bitmap 341 may have a corresponding second level bitmap 342. Processing logic may search a data structure for an identifier of a peer logical block stripe to which the blocks indicated by the second level bitmap 342 are mapped (e.g., are to be mapped).

In some embodiments, after mapping bad blocks, the distribution of bad blocks amongst logical block stripes is narrowed. In one example, a distribution 420 of FIG. 4 shows a narrowed distribution of bad blocks amongst logical block stripes of a memory device. In some embodiments, the distribution 420 is representative of the mapping of bad blocks according to the mapping scheme described with respect to FIG. 3. The distribution 420 shows a higher peak and reduced upper and lower tails. For example, the lower tail 412 of distribution 410 and the upper tail 414 of distribution 410 have been eliminated. Bad blocks of block stripes in the upper tail of distribution 410 have been mapped to block stripes in the lower tail of distribution 410, creating a higher peak and narrower overall distribution of bad blocks. Mapping bad blocks of the memory device may improve performance consistency (e.g., consistent rate of data transfer) and/or overall performance of the memory device during data write or data read operations.

FIG. 5 is a flow diagram of an example method 500 to map a bad block in a memory sub-system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the program manager 134 of FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In some embodiments, method 500 can occur during the low level formatting of the memory device (e.g., memory device 130 of FIGS. 1A, 1B, and 2).

At operation 505, processing logic identifies a first logical block stripe of a memory device (e.g., memory device 130). The first logical block stripe includes a first plurality of memory blocks of the memory device. In some embodiments, each block of the first plurality of blocks includes a first page residing on a first die of a plurality of memory dies of the memory device. In some embodiments, each block further includes a second page residing on a second die of the plurality of memory dies of the memory device. The first logical block stripe can be identified by identifying multiple blocks and treating the blocks as a single unit. As an example, illustrated in FIG. 2, a logical block stripe 220 includes a first block of physical block stripe 210, a second block of physical block stripe 211, a third block of physical block stripe 212, etc.

At operation 510, processing logic determines that the first logical block stripe belongs to a first group of logical block stripes of a plurality of logical block stripes of the memory device. In some embodiments, a first group of logical block stripes includes logical block stripes in an upper tail of a distribution of bad blocks amongst the logical block stripes of the memory device. In some embodiments, the distribution of bad blocks is determined by scanning each block of the multiple logical block stripes to determine whether the blocks satisfy an error condition. For example, processing logic scans the memory device for bad blocks (e.g., memory blocks having a BER above or below a predetermined threshold, memory blocks that are not fully or properly erased, memory blocks from which data cannot be read, etc.).

At operation 515, processing logic determines that a second logical block stripe belongs to a second group of logical block stripes. The second logical block stripe includes a second plurality of blocks. In some embodiments, a second group of logical block stripes includes logical block stripes in a lower tail of the distribution of bad blocks amongst the logical block stripes of the memory device.

At operation 520, processing logic maps a first block of the first plurality of blocks (e.g., of the first logical block stripe) satisfying an error condition to the second logical block stripe. In some examples, mapping the first block (e.g., the bad block) from the first logical block stripe to the second logical block stripe reduces the number of bad blocks in the first logical block stripe while increasing the number of bad blocks in the second logical block stripe. By mapping one or more bad blocks from the first logical block stripe to the second logical block stripe, the bad block distribution amongst the logical block stripes may be narrowed.

FIG. 6 is a flow diagram of an example method 600 to map a bad block in a memory sub-system in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the program manager 134 of FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In some embodiments, method 600 can occur during the low level formatting of the memory device (e.g., memory device 130 of FIGS. 1A, 1B, and 2).

At operation 605, processing logic scans a plurality of logical block stripes of a memory device. The plurality of logical block stripes may include logical block stripes having blocks that satisfy an error condition (e.g., bad blocks). At operation 610, based on the scanning, processing logic determines a distribution of blocks satisfying the error condition among the plurality of logical block stripes. Often, the distribution of bad blocks among the plurality of logical block stripes may be represented by a normal distribution. However, other distributions are possible. The distribution may include an upper tail representative of logical block stripes having more than a first threshold number of bad blocks. The distribution may similarly include a lower tail representative of logical block stripes having fewer than a second threshold number of bad blocks. The second threshold number may be smaller than the first threshold number. In some embodiments, the upper tail and/or the lower tail includes logical block stripes having more or fewer than two standard deviations of bad blocks away from the mean number of bad blocks. In some embodiments, the upper tail and/or the lower tail includes logical block stripes having more or less than one standard deviation of bad blocks away from the mean number of bad blocks. In some embodiments, the upper tail and/or the lower tail include between 15 and

30 logical block stripes. In some embodiments, the upper tail and the lower tail are representative of the same number of logical block stripes.

At operation 615, processing logic identifies a first group of logical block stripes based on the distribution of blocks satisfying the error condition. At operation 620, processing logic identifies a second group of logical block stripes based on the distribution. In some embodiments, the first group is associated with the upper tail of the distribution. For example, the first group of logical block stripes can include logical block stripes having more than an upper threshold of bad blocks. In some embodiments, the second group is associated with the lower tail of the distribution. For example, the second group of logical block stripes can include logical block stripes having more than a lower threshold of bad blocks (e.g., the lower threshold corresponding to the upper threshold). In some embodiments, the first group and the second group include the same number of logical block stripes. In some embodiments, the first group and the second group include a predetermined number of logical block stripes. For example, the first group of logical block stripes can include 20 logical block stripes and the second group of logical block stripes can include 20 logical block stripes. In such an example, the first group includes the 20 logical block stripes having the most bad blocks of all logical block stripes of the memory device, and the second group includes the 20 logical block stripes having the fewest bad blocks of all logical block stripes of the memory device.

At operation 625, processing logic maps a first memory block of a first logical block stripe of the first group of logical block stripes satisfying the error condition to a second logical block stripe of the second group of logical block stripes. In some embodiments, one or more parameters stored in a data structure indicate that the first logical block stripe is a corresponding peer to the second logical block stripe. In some embodiments, a first bitmap identifying the first logical block stripe as a corresponding peer to the second logical block stripe is generated. In some embodiments, a second bitmap identifying blocks to be mapped from one logical block stripe to another are generated. In some embodiments, the mapping of the first memory block to the second logical block stripe is based on the one or more generated bitmaps that indicate one or more blocks of the first logical block stripe that are to be mapped (e.g., re-mapped) from the first logical block stripe to the second logical block stripe or vice versa. In some embodiments, mapping the first memory block to the second logical block stripe effectively narrows the distribution of bad blocks among the logical block stripes. Narrowing the distribution may have the effect of increasing memory device performance consistency.

FIG. 7 is a flow diagram of an example method 700 to map a bad block in a memory sub-system in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the program manager 134 of FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In some embodiments, method 700 (excluding operation 735) can occur during the low level formatting of the memory device (e.g., memory device 130 of FIGS. 1A, 1B, and 2).

At operation 705, processing logic pairs a first logical block stripe of a first group of logical block stripes with a second logical block stripe of a second group of logical block stripes. The pairing may be for the purpose of mapping blocks between the logical block stripes. In some embodiments, the first logical block stripe and the second logical block stripe are corresponding peer logical block stripes. In some embodiments, peer logical block stripes occupy corresponding positions in the order of bad block distribution among the logical block stripes of a memory device. For example, the first logical block stripe may occupy a first position in an order of the first group of logical block stripes corresponding to the first logical block stripe having the most bad blocks of the first group. The second logical block stripe may occupy a corresponding second position in order of the second group of logical block stripes corresponding to the second logical block stripe having the fewest bad blocks of the second group. Other logical block stripes of the first group and the second group may be paired similarly.

At operation 710, processing logic generates one or more parameter indicative of the pairing performed at operation 705. In some embodiments, the one or more parameters include information or metadata that indicates the first logical block stripe and the second logical block stripe are peer logical block stripes. At operation 715, the one or more parameters are stored in a data structure. In some embodiments, the data structure is a look-up-table. In some embodiments, the data structure may be indexed so to be searchable by processing logic. For example, the data structure may be indexed so that processing logic can identify the peer logical block stripe of the first logical block stripe (e.g., the second logical block stripe) by querying the first logical block stripe, and/or so that processing logic can identify the peer logical block stripe of the second logical block stripe (e.g., the first logical block stripe) by querying the second logical block stripe.

At operation 720, processing logic determines an average number of blocks of the first logical block stripe and the second logical block stripe satisfying an error condition (e.g., processing logic determines the average number of bad blocks of the first and second logical block stripes). For example, where the first logical block stripe includes ten bad blocks and the second logical block stripe includes two bad blocks, processing logic determines that the average number of bad blocks of the first logical block stripe and the second logical block stripe is six.

At operation 725, processing logic maps a first block of the first logical block stripe satisfying the error condition (e.g., a first bad block) to the second logical block stripe. In some embodiments, processing logic maps a second block of the second logical block stripe not satisfying the error condition (e.g., a second good block) to the first logical block stripe. In some embodiments, responsive to the mapping of one or more bad blocks from the first logical block stripe to the second logical block stripe, both the first and second logical block stripes include the average number of bad blocks. The mapping of blocks may be based on one or more bitmaps indicating which blocks are to be mapped from the first logical block stripe to the second logical block stripe.

Figure 8:
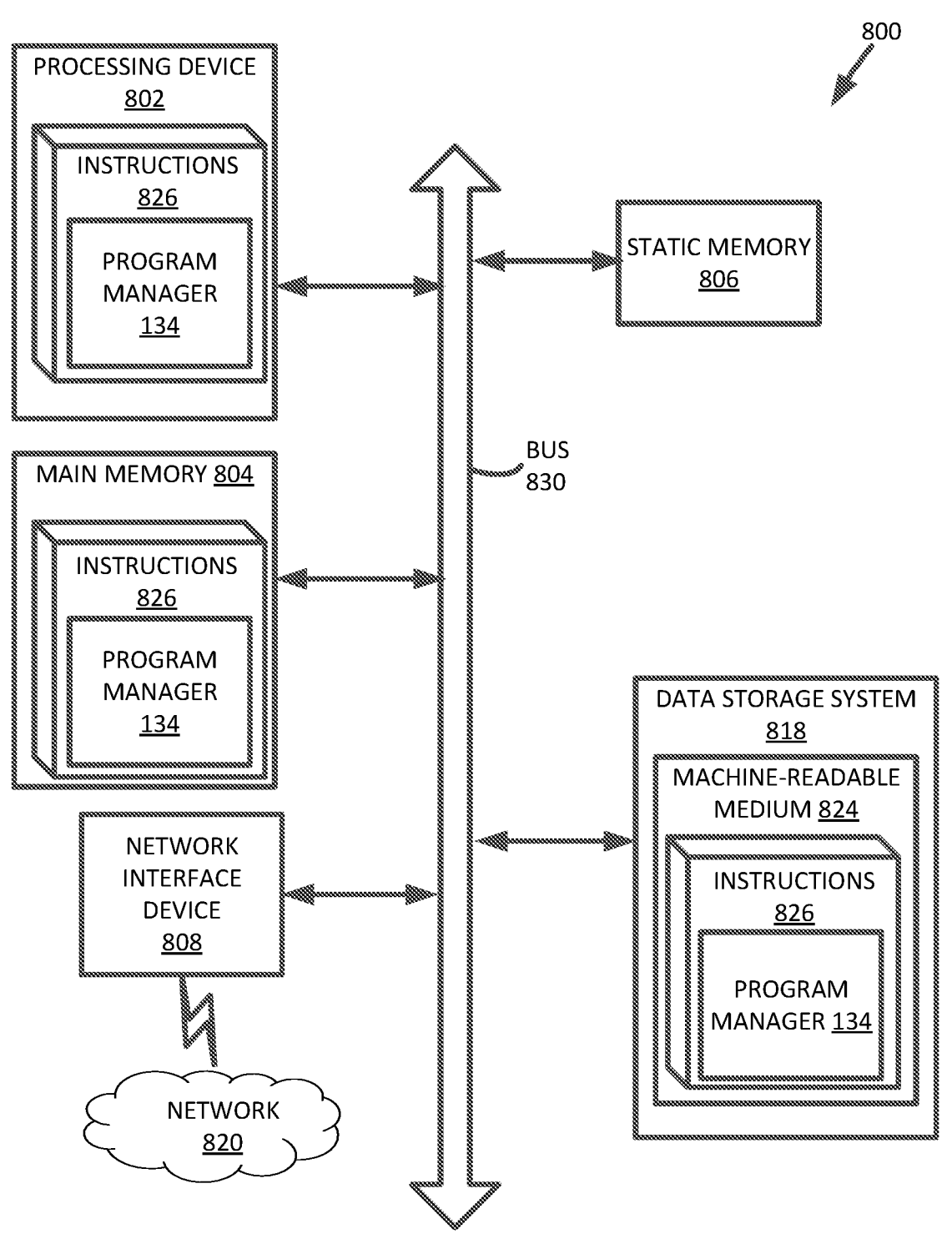
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to program manager 134 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a non-transitory machine-readable storage medium 824 (also known as a non-transitory computer-readable storage medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to a program manager component (e.g., the program manager 134 of FIG. 1A). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of memory dies; and
a processing device, operatively coupled with the memory device, to perform operations comprising:
identifying a first logical block stripe of the memory device, wherein the first logical block stripe comprises a first plurality of blocks, wherein each block of the first plurality of blocks comprises a first page residing on a first die of the plurality of memory dies and a second page residing on a second die of the plurality of memory dies;
determining that the first logical block stripe belongs to a first group of logical block stripes of a plurality of logical block stripes of the memory device;
determining that a second logical block stripe comprising a second plurality of blocks belongs to a second group of logical block stripes of the plurality of logical block stripes of the memory device;
determining an average number of blocks of the first logical block stripe and the second logical block stripe satisfying an error condition; and
mapping a first block of the first plurality of blocks to the second logical block stripe, wherein the first block satisfies the error condition, and wherein responsive to the mapping, the first logical block stripe and the second logical block stripe each comprise the average number of blocks satisfying the error condition.

2. The system of claim 1, wherein mapping the first block of the first plurality of blocks of the first logical block stripe to the second logical block stripe comprises:
generating one or more bitmaps associated with the plurality of logical block stripes of the memory device; and
mapping the first block satisfying the error condition to the second logical block stripe based on the one or more bitmaps.

3. The system of claim 2, wherein the one or more bitmaps comprises:
a first bitmap identifying the first logical block stripe as a corresponding peer to the second logical block stripe; and
a second bitmap identifying one or more blocks of the first plurality of blocks satisfying the error condition and one or more blocks of the second plurality of blocks not satisfying the error condition.

4. The system of claim 1, wherein the processing device is to perform operations further comprising:

scanning the plurality of logical block stripes of the memory device; and determining a distribution of blocks satisfying the error condition among the plurality of logical block stripes of the memory device based on the scanning.

5. The system of claim 4, wherein the processing device is to perform operations further comprising:

identifying the first group of logical block stripes based on the distribution of blocks satisfying the error condition, wherein the first group of logical block stripes comprises a predetermined number of logical block stripes corresponding to an upper tail of the distribution; and identifying the second group of logical block stripes based on the distribution of blocks satisfying the error condition, wherein the second group of logical block stripes comprises the predetermined number of logical block stripes corresponding to a lower tail of the distribution.

6. The system of claim 1, wherein the processing device is to perform operations further comprising:

pairing the first logical block stripe with the second logical block stripe based on the first logical block stripe having a first position in a first order of the first group and the second logical block stripe having a corresponding second position in a second order of the second group;

generating one or more parameters indicative of the pairing of the first logical block stripe with the second logical block stripe; and storing the one or more parameters in a data structure.

7. The system of claim 1, wherein identifying the first logical block stripe of the memory device comprises:

performing a scan of the plurality of memory dies of the memory device;

selecting a skew offset for the first logical block stripe based on the scan; and mapping the first plurality of blocks across the plurality of memory dies to the first logical block stripe based on the skew offset.

8. A method comprising:

determining a first logical block stripe of a memory device, wherein the first logical block stripe comprises a first plurality of blocks, wherein each block of the first plurality of blocks comprises a first page residing on a first die of a plurality of memory dies of the memory device and a second page residing on a second die of the plurality of memory dies of the memory device;

determining that the first logical block stripe belongs to a first group of logical block stripes of a plurality of logical block stripes of the memory device;

determining that a second logical block stripe comprising a second plurality of blocks belongs to a second group of logical block stripes of the plurality of logical block stripes of the memory device;

determining an average number of blocks of the first logical block stripe and the second logical block stripe satisfying an error condition; and mapping a first block of the first plurality of blocks to the second logical block stripe, wherein the first block satisfies the error condition, and wherein responsive to the mapping, the first logical block stripe and the second logical block stripe each comprise the average number of blocks satisfying the error condition.

9. The method of claim 8 wherein mapping the first block of the first plurality of blocks of the first logical block stripe to the second logical block stripe comprises:

generating one or more bitmaps associated with the plurality of logical block stripes of the memory device; and mapping the first block satisfying the error condition to the second logical block stripe based on the one or more bitmaps.

10. The method of claim 9, wherein the one or more bitmaps comprises:

a first bitmap identifying the first logical block stripe as a corresponding peer to the second logical block stripe; and a second bitmap identifying one or more blocks of the first plurality of blocks satisfying the error condition and one or more blocks of the second plurality of blocks not satisfying the error condition.

11. The method of claim 8, further comprising:

scanning the plurality of logical block stripes of the memory device; and determining a distribution of blocks satisfying the error condition among the plurality of logical block stripes of the memory device based on the scanning.

12. The method of claim 11, further comprising:

identifying the first group of logical block stripes based on the distribution of blocks satisfying the error condition, wherein the first group of logical block stripes comprises a predetermined number of logical block stripes corresponding to an upper tail of the distribution; and identifying the second group of logical block stripes based on the distribution of blocks satisfying the error condition, wherein the second group of logical block stripes comprises the predetermined number of logical block stripes corresponding to a lower tail of the distribution.

13. The method of claim 8, further comprising:

pairing the first logical block stripe with the second logical block stripe based on the first logical block stripe having a first position in a first order of the first group and the second logical block stripe having a corresponding second position in a second order of the second group;

generating one or more parameters indicative of the pairing of the first logical block stripe with the second logical block stripe; and storing the one or more parameters in a data structure.

14. A non-transitory computer-readable storage medium comprising instructions that, when executed by a processing device, cause the processing device to perform operations comprising:

identifying a first logical block stripe of a memory device, wherein the first logical block stripe comprises a first plurality of blocks, wherein each block of the first plurality of blocks comprises a first page residing on a first die of a plurality of memory dies of the memory device and a second page residing on a second die of the plurality of memory dies of the memory device;

determining that the first logical block stripe belongs to a first group of logical block stripes of a plurality of logical block stripes of the memory device;

determining that a second logical block stripe comprising a second plurality of blocks belongs to a second group of logical block stripes of the plurality of logical block stripes of the memory device;

determining an average number of blocks of the first logical block stripe and the second logical block stripe satisfying an error condition; and mapping a first block of the first plurality of blocks to the second logical block stripe, wherein the first block satisfies the error condition, and wherein responsive to the mapping, the first logical block stripe and the second logical block stripe each comprise the average number of blocks satisfying the error condition.

15. The non-transitory computer-readable storage medium of claim 14, wherein mapping the first block of the first plurality of blocks of the first logical block stripe to the second logical block stripe comprises:

generating one or more bitmaps associated with the plurality of logical block stripes of the memory device; and mapping the first block satisfying the error condition to the second logical block stripe based on the one or more bitmaps.

16. The non-transitory computer-readable storage medium of claim 15, wherein the one or more bitmaps comprises:

a first bitmap identifying the first logical block stripe as a corresponding peer to the second logical block stripe; and a second bitmap identifying one or more blocks of the first plurality of blocks satisfying the error condition and one or more blocks of the second plurality of blocks not satisfying the error condition.

17. The non-transitory computer-readable storage medium of claim 14, wherein the processing device is to perform operations further comprising:

scanning the plurality of logical block stripes of the memory device; and determining a distribution of blocks satisfying the error condition among the plurality of logical block stripes of the memory device based on the scanning.

18. The non-transitory computer-readable storage medium of claim 17, wherein the processing device is to perform operations further comprising:

identifying the first group of logical block stripes based on the distribution of blocks satisfying the error condition, wherein the first group of logical block stripes comprises a predetermined number of logical block stripes corresponding to an upper tail of the distribution; and identifying the second group of logical block stripes based on the distribution of blocks satisfying the error condition, wherein the second group of logical block stripes comprises the predetermined number of logical block stripes corresponding to a lower tail of the distribution.

19. The non-transitory computer-readable storage medium of claim 14, wherein the processing device is to perform operations further comprising:

determining an average number of blocks of the first logical block stripe and the second logical block stripe satisfying the error condition, wherein responsive to the mapping the first logical block stripe and the second logical block stripe each comprise the average number of blocks satisfying the error condition.

* * * * *